(12) United States Patent
Moore et al.

(10) Patent No.: US 6,557,826 B2
(45) Date of Patent: May 6, 2003

(54) LOW LEAKAGE BUTTERFLY DAMPER

(76) Inventors: Michael A. Moore, 2607 Williams St., Dighton, MA (US) 02715; Scott M. Barboza, 2621 Williams St., Dighton, MA (US) 02715

( * ) Notice: Subject to any disclaimer, the term of this patent is extended or adjusted under 35 U.S.C. 154(b) by 0 days.

(21) Appl. No.: 09/953,602

(22) Filed: Sep. 17, 2001

(65) Prior Publication Data

US 2003/0052294 A1 Mar. 20, 2003

(51) Int. Cl.[7] ................................................. F16K 1/22
(52) U.S. Cl. .............. 251/305; 137/601.11; 137/601.17
(58) Field of Search ................... 251/305; 137/601.11, 137/601.17, 601.09

(56) References Cited

U.S. PATENT DOCUMENTS

| | | | | |
|---|---|---|---|---|
| 1,978,127 A | * | 10/1934 | Downs | 137/601.11 |
| 3,044,387 A | * | 7/1962 | Dinden | 137/601.11 |
| 3,070,345 A | * | 12/1962 | Knecht | 251/305 |
| 3,241,568 A | * | 3/1966 | Mayo, Jr. | 137/601.11 |
| 3,771,559 A | * | 11/1973 | Alley | 137/601.11 |
| 3,809,361 A | * | 5/1974 | Pfundstein et al. | 251/305 |
| 4,064,934 A | * | 12/1977 | Kolthoff, Jr. et al. | 137/601.09 |
| 4,076,035 A | * | 2/1978 | Frisch | 137/601.11 |
| 4,241,647 A | * | 12/1980 | Herr | 137/601.11 |
| 4,489,917 A | | 12/1984 | Baumann | |
| 5,979,053 A | | 11/1999 | Schaeffer et al. | |

* cited by examiner

Primary Examiner—Paul J Hirsch

(57) ABSTRACT

An improved butterfly damper for air delivery systems, having multiple rotatable blades, and a centrally located blade rotating, or actuation means. Each blade comprises an offset, or displaced portion to allow concealment of the actuation mechanism upon closure. This offset portion allows the blades, upon closure, to meet and form a seal around the least complex portion of the actuation mechanism.

2 Claims, 6 Drawing Sheets

LOW LEAKAGE BUTTERFLY DAMPER

BACKGROUND

1. Field of Invention

This invention relates to volume regulating devices used in positive and negative pressure air delivery systems, specifically to centrally actuated, multiple blade butterfly type dampers commonly used in heating and air conditioning systems, to regulate air flow to a particular outlet.

2. Description of Prior Art

Air delivery or distribution systems are used for heating, ventilation and air conditioning (HVAC) requirements. These systems may consist of various sizes and types of ducts, or conduits, used to convey air to or from a desired area. In some cases air from a single source such as a fan or other air handling unit is distributed to multiple branch ducts, with each branch terminating at a grille, or diffuser.

A desirable feature of such a system is a volume damper at each diffuser to regulate airflow. This ability allows one to adjust for personal comfort, or a change in airflow requirements for the conditioned space. It is most convenient if this damper is integral with the diffuser or outlet. This allows easy access by the occupants, and pre-assembly at the factory to save labor in the field. In cooler climates it is also desirable to have the ability to completely stop the airflow at the diffuser when the system is not in use, such as in a dedicated air conditioning system during winter. Currently available dampers designed for such systems are not very airtight in the closed position. This results in unwanted airflow through the system due to temperature differential, causing drafts, and condensation. In particular, ductwork systems installed in attics are prone to this problem, especially in the presence of moist air.

Airtight dampers and valves have been produced for many purposes, but most are not suitable for HVAC systems due to cost, weight, or complexity. An argument could be made that any suitable damper could be made air tight by gasketing all moving parts. However complex shapes with multiple mating surfaces and interruptions require complex shaped, and/or multiple gaskets and are difficult to seal effectively. Also, for a damper to be accessible from the living space and be integral with the diffuser, an actuation mechanism may exist within the air stream. This complex mechanism must therefore be gasketed, which can add friction, obstruction to smooth movement, and further complexity. U.S. Pat. No. 5,979,053 by Shaeffer, et al describes an diagonally offset damper blade to achieve a seal around the blades perimeter, independent of shaft seals. U.S. Pat. No. 4,489,917 by Baumann achieves the same using a cone shaped blade. While both designs have merit for their intended use, neither will allow for a convenient actuator parallel with the flow of air to allow access through the diffuser.

OBJECTS AND ADVANTAGES

Accordingly, several objects and advantages of the present invention are:

(a) to provide a butterfly type volume damper with an actuation mechanism accessible through an air diffuser, and from the living space.

(b) to provide a means to seal the damper actuating mechanism to achieve minimal air leakage in the closed position.

(c) to provide for a sealing means along the perimeter of the damper.

(d) to provide a damper configuration or shape which allows for a continuous, uninterrupted sealing means, or gasket without having to conform to complex shapes and curves.

(e) to create a simple economical method of damper manufacture with a minimal amount of moving parts.

Further objects and advantages will become apparent from consideration of the ensuing description and drawings.

DRAWING FIGURES

Figure 1A:
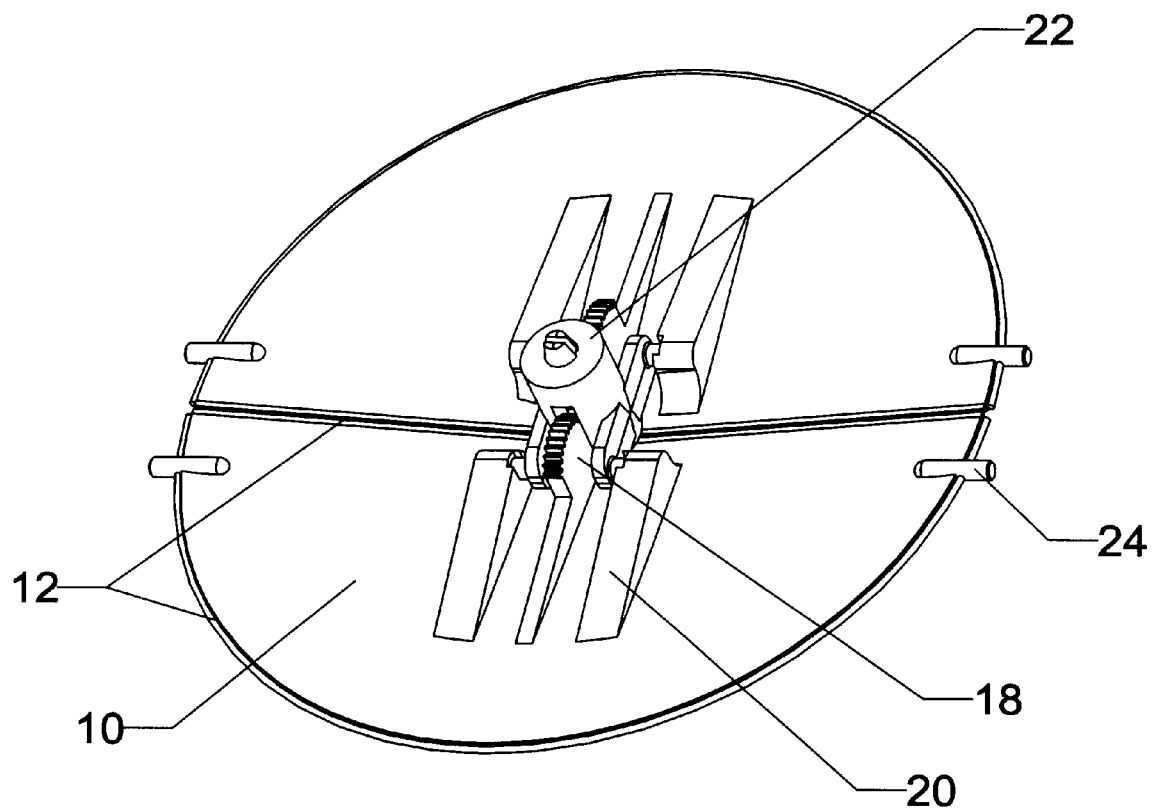
FIG. 1A depicts the assembled butterfly damper in its entirety.
Figure 1B:
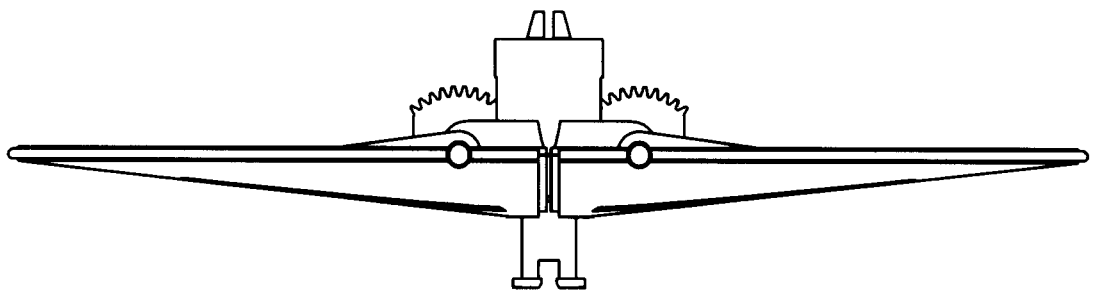
FIG. 1B shows an elevation view of the damper in its closed position.
Figure 1C:
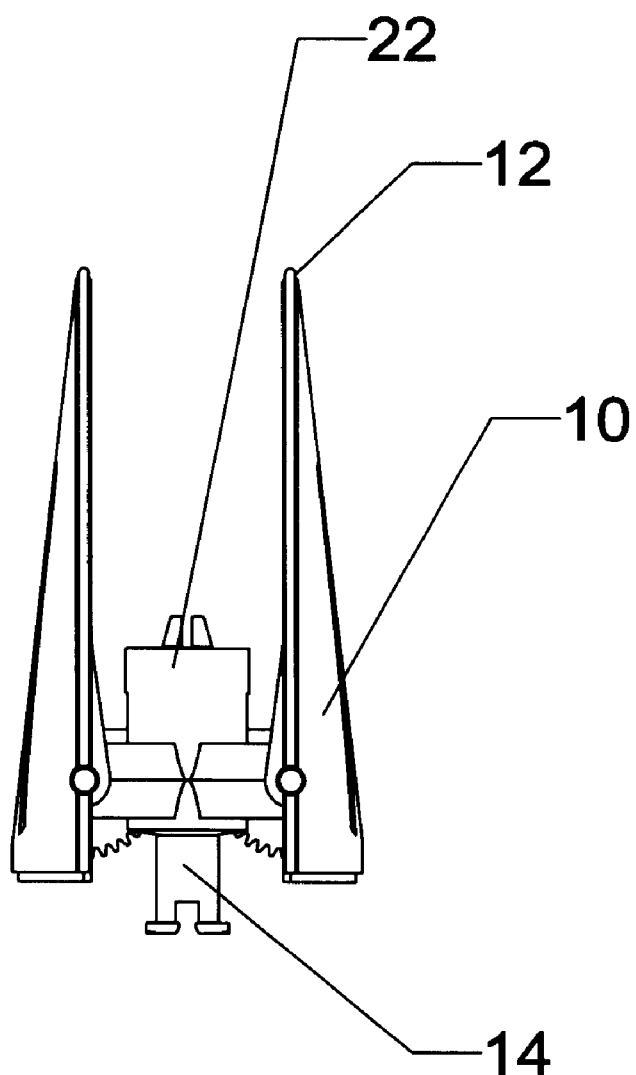
FIG. 1C shows an elevation view of the damper in its open position.
Figure 2:
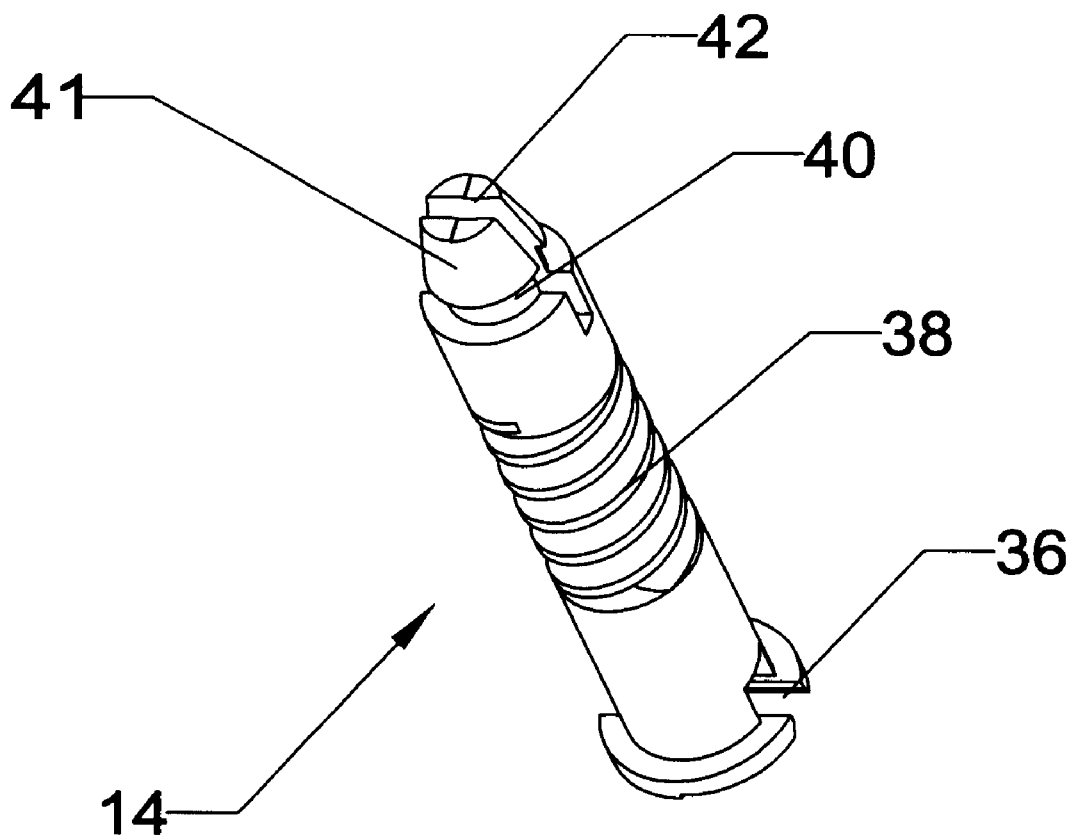
FIG. 2 shows a damper actuation screw with its various elements.
Figure 3:
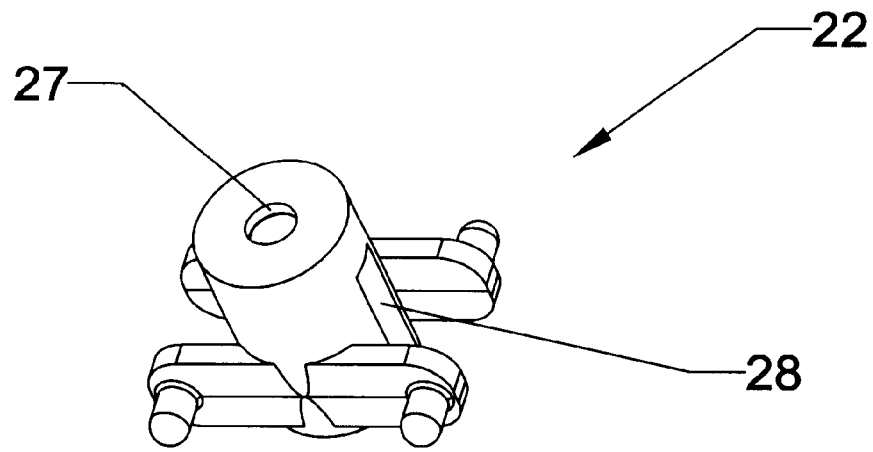
FIG. 3 shows a screw housing with its various elements.
Figure 3:
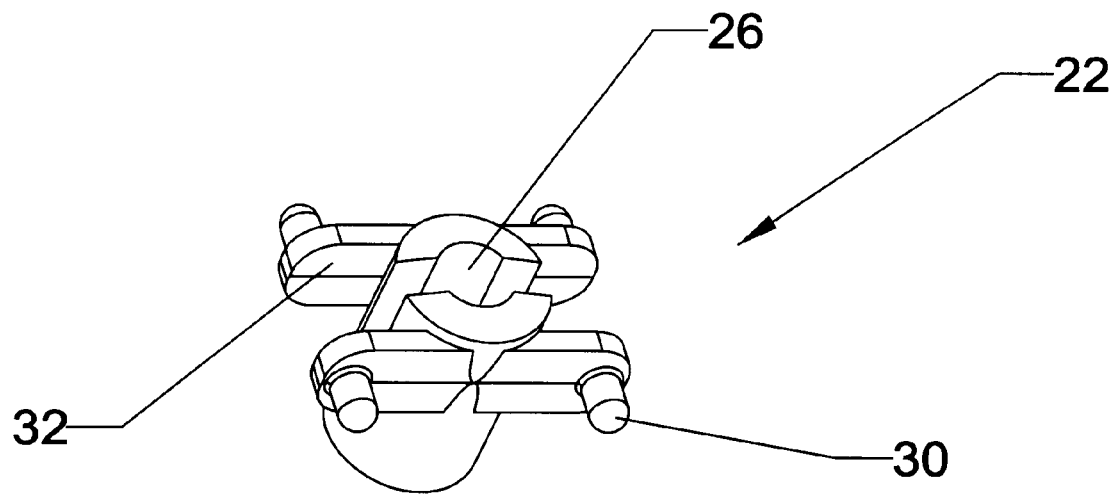
Figure 4:
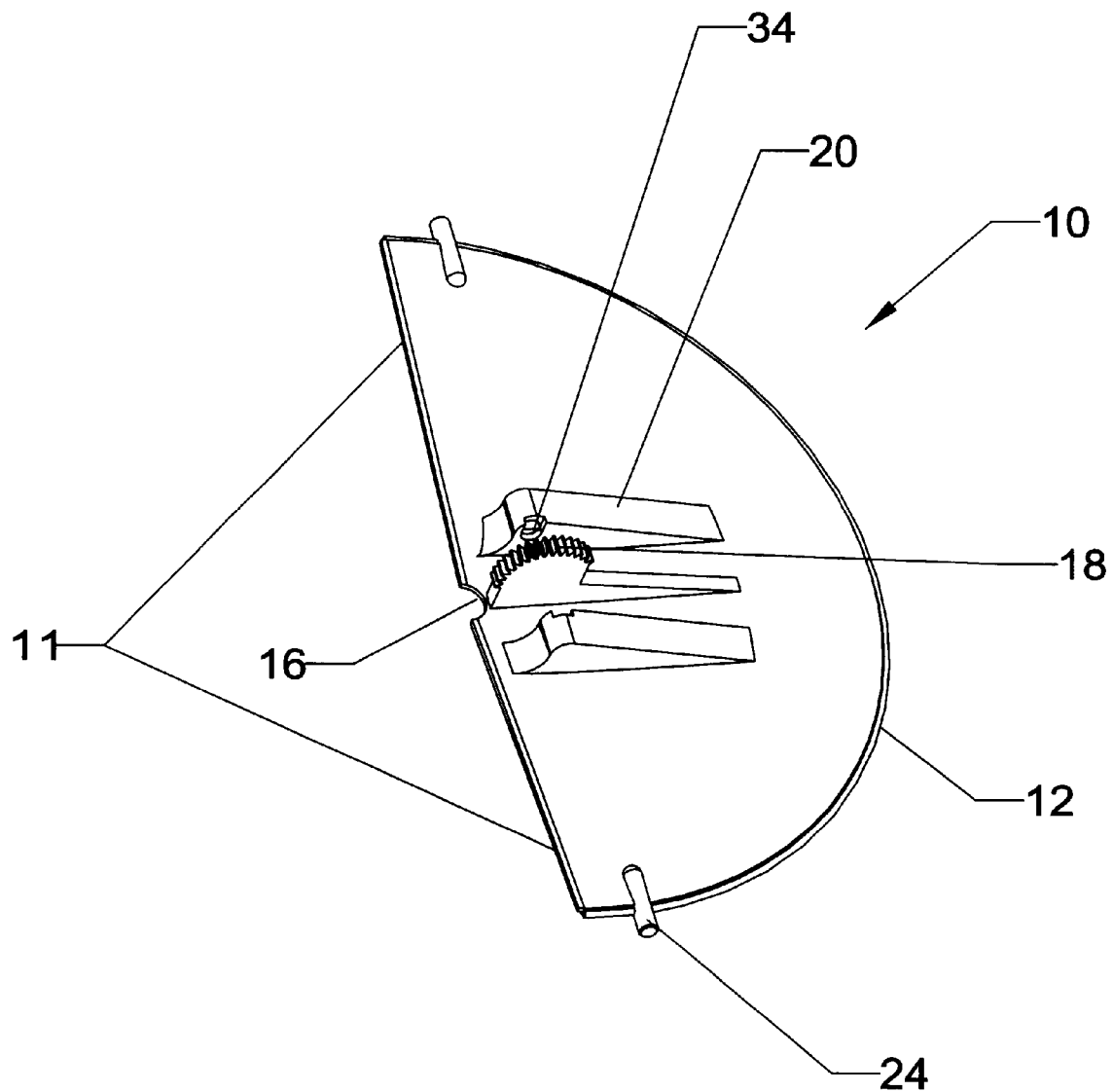
FIG. 4 shows a damper blade with its various elements.

REFERENCE NUMERALS IN DRAWING 10 damper blade
12 continuous gasket
14 actuation screw
16 screw pocket
18 gear
20 attachment gussets
22 screw housing
24 damper hinge pins
26 screw housing hole
27 screw retaining lip
28 gear slot
30 screw housing hinge pins
32 attachment arms
34 attachment holes
36 screw slot
38 threads
40 retaining lip
41 chamfer
42 recess Description FIGS. 1 to 3

FIGS. 1A through 1C depict a butterfly damper comprising two semi-frustum shaped damper blades 10. Each blades perimeter comprises an outer radius covering 180 degrees and two linear symmetrical, dihedral mating surfaces 11 joined by a second concentric inner radius, or screw pocket 16. Encircling the perimeter of blade 10 is a continuous gasket 12 made from a suitable compressible material. Protruding outwardly shaped gussets 20 are located on each blade 10, perpendicular to the linear mating surfaces. Along each gusset 20 is located an attachment hole 34 located coaxially to hinge pins 24. Placed between, and parallel to gussets 20, and adjacent to pocket 16 is a toothed gear 18 being coaxial to pins 24.

FIG. 3 shows a cylinder shaped screw-housing 22 comprising a screw-housing hole 26 located along its axis. At the first end of housing 22 is a screw retaining lip 27, located concentric to and having a smaller diameter than hole 26. Two parallel, symmetrical attachment arms 32, each having a rectangular cross-section, are placed on opposite sides of housing 22 tangent to the outer perimeter, and perpendicular to the axis of housing 22. Along each arm 32 at equal distances from housing 22 are a pair of parallel outwardly facing hinge pins 30, each having an axis perpendicular to arms 32 and hole 26. A rectangular gear slot 28 is formed from the second end of housing 22, parallel to and encompassing hole 26, and housing 22, to a sufficient depth.

FIG.2 depicts a damper actuation screw 14. A drive slot of sufficient depth is centered on its first end. A similar slot, or recess 42 is located on its opposite, or second end. On the second end, along the outer diameter is a chamfer 41. Adjacent to chamfer 41 is an area of reduced diameter forming a retaining lip 40. Helical threads 38 are formed along a substantial length of screw 14.

Operation—FIGS. 1 to 3

The assembly, operation, and function of the parts comprising the present invention is described below.

During factory assembly, the second end of screw 14 is inserted into hole 26 from the second end of housing 22. The chamfer 41 allows partial insertion into the smaller diameter of retaining lip 27. Upon further insertion, recess 42 allows deflection of the second end of screw 14. On reaching final installed position, the second end of screw 14 returns to its original shape, fixing screw 14 in position, while still allowing rotation.

Attachment arms 32 are deflected inwardly toward each other, then released in a position allowing engagement between holes 34, and pins 30. This process is repeated to the other blade. This will allow rotation of blades about the axis of pins 30.

This assembly is located into, or in close proximity to an air outlet, or diffuser by inserting hinge pins 24 into a series of holes properly located on, or proximally to an air diffuser. Screw 14 is accessed with a flat bladed screwdriver, placed through the diffuser. As screw 14 is rotated, engagement with gears 18 will cause each blade 10 to rotate in position causing progressive blockage of airflow path. At the fully closed position gasket 12 will mate with the diffuser, or duct wall, along the outer perimeter of blades 10. Also, gaskets 12 will meet and seal dihedral mating surfaces 11, and most importantly, gasketing along screw pocket 16 will contact and seal any gap around screw 14.

Summary, Ramifications, and Scope

Accordingly, the reader will see that the low leakage butterfly damper provides a simple, efficient method to effectively regulate, and seal airflow within an air system. The unique shape of the damper blades allows sealing of the actuation mechanism along its least complex point (screw 14) with no interruptions in the gasket 12.

Although the above description contains many specificities, these should not be construed as limiting the scope of the invention, but as merely providing an illustration of the preferred embodiment. For example, the dampers outer perimeter may be rectangular, oval or any shape suitable for the application. The damper may include a gasket, or may rely on a tight fit, or flexibility of its material to form a seal. Also, the shape of the blades may be entirely or partially, conical, or parabolic, and/or comprise a suitably shaped area to conceal the actuation mechanism.

Thus the scope of the invention should be determined by the appended claims and their legal equivalents, rather than by the examples given.

What is claimed is:

1. A butterfly type damper, used to regulate airflow within a building's heating, air conditioning, or ventilation air delivery system comprising:
   (a) a blade positioning means, located within the air stream of said system,
   (b) a plurality of blades, of said blades one or more after having a displaced portion from said positioning means to minimize air flow around said positioning means upon closure of said damper, whereby said blade positioning means comprises one or more worm driven gears to position said blades.

2. The damper in claim 1 further including a gasket means surrounding the perimeter of said blades whereby said gasket means fills any gaps and restricts airflow around said blade positioning means.

* * * * *